United States Patent [19]
Liu et al.

[11] Patent Number: 5,908,715
[45] Date of Patent: Jun. 1, 1999

[54] COMPOSITE CARBON MATERIALS FOR LITHIUM ION BATTERIES, AND METHOD OF PRODUCING SAME

[75] Inventors: Qingguo Liu; Weihua Qiu; Leiling Yang; Shigang Lu, all of Beijing, China

[73] Assignee: Hughes Electronics Corporation, El Segundo, Calif.

[21] Appl. No.: 08/866,036

[22] Filed: May 30, 1997

[51] Int. Cl.[6] .................................................. H01M 4/02
[52] U.S. Cl. ...................................... 429/217; 429/231.8
[58] Field of Search ............................ 429/42, 194, 248, 429/217, 218; 29/623.1; 423/447.7, 445

[56] References Cited

U.S. PATENT DOCUMENTS

| | | | |
|---|---|---|---|
| 4,294,893 | 10/1981 | Iemmi et al. | 429/42 |
| 5,451,477 | 9/1995 | Omaru et al. | 429/218 |
| 5,571,638 | 11/1996 | Satoh et al. | 429/248 |
| 5,595,838 | 1/1997 | Yamada et al. | 429/209 |
| 5,753,387 | 5/1998 | Takami et al. | 429/194 |

FOREIGN PATENT DOCUMENTS

| | | |
|---|---|---|
| 0 627 777 A2 | 5/1994 | European Pat. Off. . |
| 0 627 777 A3 | 5/1994 | European Pat. Off. . |

OTHER PUBLICATIONS

Megahed, S., et al. "Rechargeable Nonaqueous Batteries" The Electrochemical Society Interface, Winter 1995, pp. 34–37.

Dahn, J.R., et al. "Mechanisms for Lithium Insertion in Carbonaceous Materials" Science, Oct. 27, 1995, vol. 270, pp. 590–593.

Hossain, S. "An Overview of Lithium–Ion Technology" The Thirteenth International Seminar on Primary and Secondary Battery Technology and Application, Embassy Suites Hotel, Boca Raton, FL, Mar. 4–7, 1996.

*Primary Examiner*—Maria Nuzzolillo
*Assistant Examiner*—Angela J. Martin
*Attorney, Agent, or Firm*—V. D. Duraiswamy; M. W. Sales

[57] ABSTRACT

A composite particulate material for use in anodes of lithium-ion batteries. The particles of the material include a graphite core that has been provided with a surface layer including a non-graphitizable carbonaceous material. The graphite core having an interplanar spacing of at least about 0.346 nm. The method of producing the composite is also disclosed.

17 Claims, 3 Drawing Sheets

COMPOSITE CARBON MATERIALS FOR LITHIUM ION BATTERIES, AND METHOD OF PRODUCING SAME

BACKGROUND OF THE INVENTION (a) Field of the Invention

The present invention relates generally to lithium ionic batteries and, more particularly, to anode materials for use in rechargeable lithium ionic batteries.

(b) Description of Related Art

As a consequence of the rapid advancements made in microelectronics, the size and weight of portable electronic devices have been significantly reduced. This has spurred the development of many business- and entertainment-related portable electronic devices that require safe, long-life, and high energy density rechargeable batteries.

A battery or voltaic cell generally includes two chemicals or elements with differing electron-attracting capabilities that are immersed in an electrolytic solution and connected to one another through an external circuit. These two chemicals can be referred to as an electrochemical couple. In a zinc-acid cell, for example, the electrochemical couple is a zinc-hydrogen ion couple. The reaction that occurs between an electrochemical couple in a voltaic cell is an oxidation-reduction reaction.

The mechanism by which a battery generates an electric current typically involves the arrangement of chemicals in such a manner that electrons are released from one part of the battery via an oxidation-reduction reaction and made to flow through an external circuit or cell connection to another part of the battery. The element of the battery at which the electrons are released to the aforementioned circuit is called the anode, or the negative electrode. During discharge, oxidation reactions occur at the anode. The element that receives the electrons from the circuit is known as the cathode, or the positive electrode. During discharge, reduction reactions occur at the cathode.

At rest, a voltaic cell exhibits a potential difference (voltage) between its two electrodes that is determined by the amount of chemical energy available when an electron is transferred from one electrode to the other. The current that flows from a cell is determined by the resistance of the total circuit, including that of the cell itself. Further, a voltaic cell has a limited energy content, or capacity, that is generally given in ampere-hours and determined by the quantity of electrons that can be released at the anode and accepted at the cathode. When all of the chemical energy of the cell has been consumed (usually because one of the electrodes has been completely exhausted) the voltage falls to zero and will not recover unless the battery can be recharged. The capacity of the cell is determined by the quantity of active ingredients in the electrode.

There are two major types of voltaic cells, primary batteries and secondary (or "storage") batteries. Primary batteries are constructed so that only a single continuous or intermittent discharge can be obtained. Secondary batteries are constructed so that they can be discharged and then recharged to approximately their original state. Secondary batteries often include several identical voltaic cells.

Of the various types of secondary batteries currently available commercially, the lead-acid type is the most widely used, serving as a power source for the electrical systems of automobiles, for example. The active constituents of a lead-acid battery are sulfuric acid and two sets of plates (electrodes), one containing pure, elemental lead and the other lead dioxide. Each component cell includes several of these plate pairs connected in parallel and is capable of delivering approximately two volts. Therefore, three or six cells are typically connected in series to make a six or twelve volt battery, respectively. During discharge, the plate materials are converted into lead sulphate and the sulfuric acid is depleted. Discharge stops before all component chemicals are exhausted, usually when the acid can no longer physically reach the active materials. Charging the battery by passing a direct current through it reverses the chemical changes described above, displacing the sulphate from the plates and causing a rise in the specific gravity of the sulfuric acid.

Another type of secondary or storage battery is the nickel-cadmium battery, which operates similarly to the lead-acid battery described above, but with different chemical constituents. This type of battery can include a nickel hydroxide cathode and a cadmium anode immersed in an electrolytic solution of potassium hydroxide.

Presently, the most widely used rechargeable batteries are believed to be aqueous solution secondary batteries such as lead-acid, nickel-cadmium and nickel metal-hydride batteries. However, at least partially as a result of their relatively low energy densities, these aqueous solution batteries do not provide sufficiently long battery life.

Prior to approximately 1991, substantial worldwide research and development efforts were dedicated to the development of rechargeable lithium metal-based anode batteries because it appeared such batteries could produce energy densities as high as 150–200 Wh/kg (watt-hours per kilogram). However, it was found that this type of lithium battery could not be produced or manufactured successfully, at least on a commercial scale, because of severe safety problems associated with the metallic lithium anode interface during cycling. Safety problems with such batteries can include the danger of fires and explosions resulting from the lithium metal present therein.

In approximately 1991, Sony Corporation introduced a lithium ion ("Li-ion") battery. The fundamental difference between this battery and the aforementioned lithium metal battery is that the lithium (metal) anode was replaced by an anode made of a carbon material. In this battery, lithium metal need not be present at any time. Rather, lithium ions are dissolved in a non-aqueous electrolytic solution. These lithium ions could be transported back and forth between an intercalation compound cathode (normally containing a lithiated transition metal oxide such as $Li_xCoO_2$ or $LiMn_2O_4$) and a carbon intercalation anode (such as $Li_xC_6$). In this arrangement, metallic lithium is not plated and stripped in the battery, and the safety of the system was significantly improved. Such batteries are described in Megahed et al., "Rechargeable Nonaqueous Batteries," *Interface* (Winter 1995); Azuma et al., "Extended Abstracts of Fall Meeting Electrochemical Society of Japan," Oct. 12–13, 1991; von Sacken, "Extended Abstracts, Seventh International Meeting on Lithium Batteries," May 15–20, 1994; and Ozawa et al., "10th International Seminar on Primary and Secondary Battery Technology and Application," March 1993, the respective disclosures of which are hereby incorporated herein in their entirety.

The aforementioned commercial Li-ion battery anode was composed of a non-graphitizable carbon material having a low crystalline property formed by heat-treating an organic material such as a furfural alcohol resin at a relatively low temperature. Non-graphitic carbon materials are generally manufactured with an intermediate temperature heat treatment, for example, about 700° C. to about 1300° C. A Li-ion battery including this non-graphitic carbon anode, a LiCoO$_2$ cathode, and a liquid electrolyte comprising a propylene carbonate ("PC") solvent has been commercially available since approximately 1991.

Other carbon materials such as graphite, which has a high degree of crystallinity, have been studied as an anode material for Li-ion batteries. Graphite, however, had been considered to be less suitable for the anode because graphite decomposes propylene carbonate, which is the principal solvent used in the aforementioned non-aqueous Li-ion battery. However, it has been found that by replacing PC with ethylene carbonate ("EC") as the principal solvent, the rate of solvent decomposition is small enough to allow for use with natural graphite. Thus, a non-aqueous Li-ion secondary battery which has an anode formed of graphite and a non-aqueous liquid electrolyte using EC as the main solvent has been developed.

Although the solvent decomposition problem of graphite anode batteries has been reduced, the powder grains of graphite typically exhibit a plate-like shape with the shorter dimension along the crystallographic "c" axis (perpendicular to the plates of carbon atoms). This typically gives rise to anisotropic (dependent upon direction) flow properties under shear, so that an anode made of a rolled or pressed foil of graphite powder might exhibit a high degree of preferred orientation, undesirably resulting in particles with a c-axis perpendicular to the electrode surface. Such an orientation has been found to reduce the kinetics of lithium intercalation, since in this case the lithium ions must intercalate into the graphite at the edges of the plate-like structures which are oriented away from the electrolyte-carbon interface.

A graphite anode having a high true density (e.g., greater than 2.1 g/cm$^3$) and a high intercalation capacity (372 mAh/g) exhibits a high energy density, as well as a relatively flat discharge curve. Therefore, batteries assembled with a graphite anode can provide the advantage of generating little or no energy loss in voltage conversion by an electronic device. However, an anode formed of planar oriented graphite, as described above, can require lithium ions to diffuse longer distances during charge and discharge cycles, and is likely to cause polarization. As a result, if the battery is charged with a relatively high current, an overpotential caused by the slow diffusion rate makes the anode potential more negative than the potential of lithium metal, possibly causing lithium metal to precipitate or plate on the surface of the graphite anode.

Therefore, it would be advantageous to provide an anode material having a relatively high capacity of graphite material in a form that will also have better cycle life than graphite.

Non-graphitic carbon materials typically include numerous disordered areas and some graphite-like crystallites in its particles. The coherence lengths of crystallites (aligned graphite sheets) are in the ranges of about 15–40 angstroms and about 20–100 angstroms for c-axis and a-axis, respectively. Due to the disordered structure, there are many orientations and many diffusion routes, thereby causing the diffusion rate of lithium ions into non-graphitic carbon to be relatively high. The carbon layers of non-graphitic carbons are cross-linked, resulting in a stable structure. A Li-ion battery utilizing a non-graphitic carbon anode shows high current output and less polarization. Even when such a battery is charged at high current densities, with such anodes there is no lithium metal precipitation on the carbon particle surface. Such unique characteristics of non-graphic carbon anode materials make the Li-ion battery advantageous for high charge and discharge currents and excellent rechargeability. These batteries are typically able to endure more than 1000 cycles. However, the lower true density of non-graphitizable carbon (<1.70 g/cm$^3$), and the lower intercalation capacity of lithium ions into non-graphitic carbon (about 80% of the capacity of graphite) are the major disadvantages of non-graphitic carbon anodes.

To summarize, graphite anodes typically show high energy density and flat voltage discharge characteristics, but poor cycle life and severe capacity decay. Non-graphitic carbon anodes typically have excellent rechargeability and large charge/discharge current capabilities, but low packing density and low energy density.

In order to find a structure that combines the benefits of both graphite and non-graphitic carbons for anode electrode applications, a core-shell structure has been proposed by Isao Kuribayashi et al., "Journal of Power Sources," Vol. 54, pp. 1–5 (1995). The carbonaceous materials disclosed therein have an outer shell made of coke-like carbon and a core composed of graphite or pseudo-graphite. Each powder consists of natural graphite, spherical artificial graphite and pseudo-graphite from heat-treated mesophase-pitch beads, or polyhedral artificial graphite from coal tar, and was coated with pitch-blended phenol resins (modified phenol resins) in a kneader and then heat-treated at up to 1200° C. in a nitrogen gas atmosphere. The distance between graphitic planes or plates in the carbon ("d(002)") of the graphite core and petroleum coke shell were 3.36 and 3.54 angstroms, respectively. The disclosed process utilized mechanical mixing, and the petroleum coke shell from phenol resins was a graphitizable carbon (d(002)=3.54). However, because the mechanically-made coating was not much different from the graphite (as shown by the d spacing), it is understood that the diffusion rate of lithium ions and battery performances could not be significantly improved by means of the disclosed technique.

A method for improving the rechargeability of lithium ion batteries assembled with graphite anodes has also been proposed by Atsuo et al. (European Patent Publication No. 627,777 dated Dec. 7, 1994). In this method, the carbon material for the anode contains both graphite and a non-graphitic carbon material formed of at least one of a non-graphitizable carbon material or a graphitizable carbon material. The graphite has a true density of 2.1 g/cm$^3$ or greater, an interplanar distance of (002) of less than 0.340 nm, and a c-axis crystallite size of 14 nm or greater. The non-graphitizable carbon material is disclosed as having a true density of 1.70 g/cm$^3$ or less and an interplanar distance of 0.37 nm or greater. In this disclosure, a graphite powder was formed by grinding natural or artificial graphite. A non-graphitic carbon was produced by grinding and oxidizing petroleum pitch or coal pitch to form a carbon precursor. The carbon precursor was ground and then heat-treated to form a non-graphitizable carbon powder.

The graphite powder and the non-graphitic carbon thus produced were mechanically mixed at various ratios to form concomitant bodies of graphite and non-graphitic carbon material. With the resulting concomitant body used for the anode, a non-aqueous liquid electrolyte secondary Li-ion battery (coin or cylindrical shapes) was produced. By increasing the content of non-graphitic carbon in the whole concomitant body, this document states that polarization values were decreased, and cycling life and battery capacity were increased. However, this composite anode is a mechanical mixture of different graphite powders and different non-graphitic carbons. It is believed that the mechanical mixing process disclosed therein could not ensure the optimum distribution of non-graphitic carbon and graphite powders, particularly on large scales.

SUMMARY OF THE INVENTION

This invention is directed to a composite carbon particulate material for use in anodes of lithium-ion batteries ("LIB"). The particles of the material include a graphite core that has been provided with a surface layer including a non-graphitizable carbonaceous material.

The invention is also directed to a method of producing a composite particulate material useful as an anode in a lithium-ion battery. In accordance with one preferred embodiment of the invention, a composite carbon powder can be produced by heat-treatment of a composite precursor powder.

The invention itself, together with further objects and attendant advantages, will best be understood by reference to the following detailed description, taken in conjunction with the accompanying drawings.

DETAILED DESCRIPTION OF A PREFERRED EMBODIMENT

Figure 1:
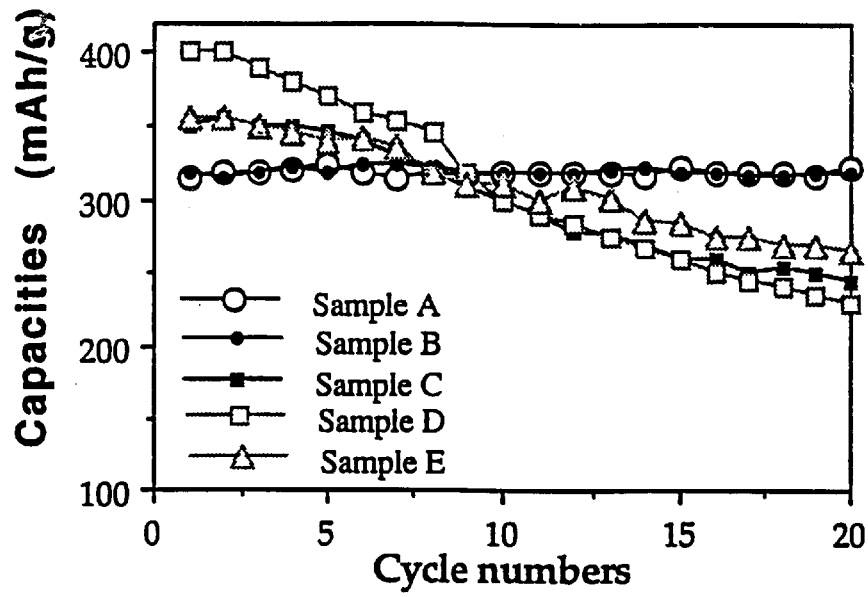
FIG. 1 is a graph showing the relationship of capacities with cycle numbers for various sample anodes.

The present invention provides a method of preparing a composite particulate material having superior electrochemical properties. The material is advantageously used in the manufacture of lithium-ion ("Li-ion") batteries.

Generally, each particle or grain of the composite material of the invention includes a graphite particle or core that is provided with an outer layer of a non-graphitizable carbonaceous material that seals at least a portion of the surface of the graphite core. The core material preferably comprises natural graphite powder, although artificial graphite and pseudo-graphite can also be utilized in accordance with the invention. The graphite powder preferably has an average particle diameter in a range of about 1 micron to about 20 microns, and more preferably in a range of about 5 microns to about 15 microns, for example about 6.31 microns. The surface area measured by the BET method known in the art is about 12.6 square meters per gram.

The graphite powder or particles are preferably embedded into a cross-linked polymer to form a composite precursor powder. The cross-linked polymer can be synthesized in situ on the surface of each particle of the graphite powder. The composite carbon powder precursor is then heat-treated at an elevated temperature, preferably in a range of about 700° C. to about 1600° C., and more preferably in a range of about 800° C. to about 1500° C., for example about 1000° C. The inventive particles produced thereby have a graphite core and a non-graphitizable carbon shell. The weight percentage of graphite is preferably in a range of about 10% to about 90% based upon the total weight of the composite, and more preferably in a range of about 50% to about 85%.

The inventive particulate material is advantageously utilized as an anode material in the manufacture of rechargeable, or secondary, lithium-ion batteries. The cathode of lithium-ion batteries of the invention is preferably a lithium-ion accepting material, including various lithiated transition metal oxides, such as $LiMn_2O_4$, $LiCoO_2$, $LiNiO_2$, for example, as well as alloys or mixtures of these materials. These materials are generally open-structured compounds that are capable of accepting and releasing lithium ions into and out of its crystal lattice.

A non-aqueous organic electrolyte that is capable of conducting lithium ions should be used with the invention. Examples of useful solvents include ethylene carbonate ("EC"), dimethyl carbonate ("DMC"), propylene carbonate ("PC"), and 1,2-dimethyoxyethane ("DME"). The electrolyte can alternatively be a solid, such as a lithium ion conducting polymer membrane.

Generally speaking, the discharge process of lithium ion batteries, including those of the invention, involves the deintercalation of lithium ions from the anode material of the invention, migration across the electrolyte and insertion into the lattice of the cathode material in the cell. Meanwhile, electrons travel in an external circuit to the electronic band structure of the anode to compensate for the cationic charge (plus one) of the lithium ions. The charging process is the reverse of the discharge process.

Other suitable lithium-ion batteries are described in the materials described above, as well as S. Hossain, "An Overview of Lithium-Ion Technology", The Thirteenth International Seminar on Primary and Secondary Battery Technology and Application (Mar. 4–7, 1996), the disclosure of which is hereby incorporated herein by reference in its entirety.

The following is a description of several preferred methods and products of the present invention.

EXAMPLE 1

According to a first preferred method of the invention, 10 grams of natural graphite powder were mixed with 15 grams of acetone. 7 grams of E44 epoxy resin (Shanghai Chemical Plant) and 0.63 grams of ethylene diamine were added. (The E44 resin is similar to a resin designated EPON44 by Shell Oil Co.) Ethylene diamine is the preferred crosslinking catalyst and reactant. Although other curing agents such as other amines or succinic anhydride can also be used, ethylene diamine is preferred due to its quick cure when compared to other curing agents.

The resulting mixture was ground in an agate mortar, until the acetone evaporated and the epoxy resin was cured. After curing, the graphite/epoxy precursor is still as fine of a powder as the original graphite powder. The particle of the precursor has a graphite core embedded into a cross-linked epoxy resin.

The graphite/epoxy carbon precursor powder is preferably placed in a tube furnace having an inert argon atmosphere. The powder is then heated to about 1000° C. at a heating rate of about 5° C./min. The product is then held at about 1000° C. for approximately 5 hours. After cooling to room temperature in the furnace, the composite carbon should be ground to a fine powder (−240 mesh ASTM, for example) to obtain the epoxy coke/graphite composite carbon particles.

A composite material was made in accordance with Example 1, and the interplanar spaces of the graphite core and epoxy coke were determined with x-ray diffraction to be 0.346 nm and 0.378 nm, respectively. The composite carbon product produced by this method, referred to herein as "Sample A," contains about 75 wt. % graphite and about 25 wt. % non-graphitizable carbon.

The composite carbon product was mixed with 5 wt. % polytetrafluoroethylene (PTFE) emulsion binder solution (containing about 60% PTFE). The mixture was then rolled into films having a thickness of about 150 microns. A "button cell" battery (a simple test cell) was used to characterize the electrochemical properties of the composite carbon anode, wherein the composite carbon film was used as the working electrode and lithium film as the counter electrode. A counter electrode is usually the electrode opposite the working electrode in a two-electrode cell.) Tests were made with two different non-aqueous electrolyte solutions: with 1 M $LiClO_4$—EC—DMC (1:1) and with 1 M $LiClO_4$—PC—EC—DME (4:3:3).

As described in greater detail below, during discharge of the lithium metal in the test cells, lithium ions were intercalated into the composite particles, and deintercalated during charging. The charge/discharge was galvanostatically performed within a voltage range of about 0.001V to about 2.00V.

EXAMPLE 2

In accordance with another method of the invention, two hundred milliliters of furfural alcohol solution (80 volume percent furfural in water) and 40 grams of SPG graphite powder (median diameter of 6.3 micrometers) are placed in a Wolff reaction bottle (a three-necked bottle) and mixed. At constant temperature of about 70° C., 2 ml of 2 M $H_2SO_4$ is slowly added into the mixture under continuous stirring. After increasing the system temperature to about 100° C., an additional 1 ml of 2 M $H_2SO_4$ is slowly poured into the reaction bottle. The temperature of the system is held at 100° C. for about one hour, followed by the addition under continuous stirring of 2 N NaOH solution until neutralization is achieved.

After stirring, the mixture is poured into a separating funnel, and it separates into two layers. The sublayer, which is a composite of graphite powder and furfural alcohol resin, is separated. The furfural alcohol resin can be further cross-linked by adding 1 M of $H_3PO_4$ (about 5 wt. % based upon the furfural alcohol resin), followed by increasing the temperature to 150° C. and standing at 150° C. for about 24 hours.

A solid composite made in accordance with the above method was crushed and ground to a fine powder, heat-treated for about 5 hours at about 1000° C. with a heating rate of approximately 5° C./min., and then cooled in the furnace to produce furfural alcohol resin coke/graphite composite carbon particles (referred to herein as Sample B).

X-ray diffraction of Sample B indicated that the composite carbon material contained about 78 wt. % graphite and about 22 wt. % non-graphitizable coke. The interplanar spaces for the graphite core and non-graphitizable coke exterior were determined to be 0.346 nm and 0.381 nm, respectively. The median particle diameter of the furfural alcohol resin coke/graphite composite carbon material is in a range of about 10 to about 13 microns (about two times the median particle diameter of the original SPG graphite powder).

An electrode film and test cell were prepared in the same manner as in Example 1.

EXAMPLE 3

An absorption synthesis method was used to prepare a graphite/polyaniline carbon precursor. Aqueous 1 M hydrochloric acid (HCl), graphite powder, purified aniline (the amount of aniline being about 120 wt. % based upon the weight of graphite) were successively added to a Wolff reaction bottle to form a suspension. Although various protonic acids can be utilized to form an aniline salt, such as $HClO_4$ or HCl, HCl is preferred for safety and cost reasons. Thus, 150 ml of 1 M HCl, 12 grams of SPG graphite, and 10g of purified aniline were added with nitrogen flowing through the Wolff reaction bottle. The suspension was stirred and cooled to a temperature in the range of about 0° C. to about 5° C. in a nitrogen atmosphere.

6 grams of $(NH_4)S_2O_8$ were dissolved in 100 ml of 1 M $HClO_4$ aqueous solution. This solution was added slowly to the reaction bottle (giving a molar ratio of $(NH_4)S_2O_8$ to aniline of about 1:1). $(NH_4)S_2O_8$ is an oxidizing agent that is able to cause polymerization of the aniline. After adding $(NH_4)S_2O_8$, the system was stirred for about one hour to about two hours at approximately 0–5° C., followed by gradually increasing the temperature to about 20° C. to about 25° C. over a three-hour period. The system was then held at about 20° C. to about 25° C. for about four hours to about eight hours. An acid-proof funnel was used to separate the synthesized polyaniline/graphite powder. The powder product was washed with a 1 M acid solution until no $SO_4^{2-}$ (sulfate ion) was detected.

The powder was subsequently again washed with a 0.1 M acid solution three times, and dried at about 30° C. within a flowing nitrogen atmosphere. The synthesized polyaniline shell is an emeraldine salt, a form of polyaniline known to those of skill in the art, with a purple-blue dark color. The polyaniline/graphite powder produced by this method was washed with ammonium water (2 M) to transfer emeraldine salt to emeraldine base, another form of polyaniline known to those of skill in the art. The polyaniline/graphite powder was then completely dried in a vacuum for 48 hours at about 50° C. to about 80° C.

The dried polyaniline/graphite carbon precursor powder produced by the above method was heated in a furnace to about 1000° C. at a heating rate of 5° C./min. and held at about 700° C. to about 1500° C. for five hours. After being cooled, polyaniline coke/graphite composite carbon was obtained (referred to herein as Sample C). X-ray diffraction results show that the composite contains about 80 wt. % graphite and about 20 wt. % polyaniline coke. The interplanar spaces of graphite core and non-graphitic carbon were found to be 0.346 nm and 0.365 nm, respectively.

An electrode film and test cell were prepared in the same manner as Example 1.

COMPARATIVE EXAMPLE 4

Comparative Example 4 uses poly(p-phenylene) (PPP), which is a linear macromolecular polymer containing only benzene. The synthesis of PPP is described in Peter Kovacic, J. Polymer Science, Vol. 85, p. 454 (1963), the disclosure of which is incorporated herein by reference in its entirety.

100 ml of benzene, 40 grams of SPG graphite powder, and 190 grams of $AlCl_3$ were mixed and stirred in a reaction beaker (1000 ml). 192 grams of $CuCl_2$ were added. The mixture was stirred, and then a drop of water was added into the mixture to trigger a PPP synthesis reaction. The beaker was put in a water bath, and the synthesis proceeded for 30 minutes at 35° C. under stirring. Then, the temperature of the mixture was cooled down to less than about 5° C. and deionized water was slowly dropped into the reaction beaker. When the water was dropped into the system, HCl gas was generated, and the temperature increased. Water was added slowly until no more HCl gas was generated. More water was added to the mixture, bringing the final volume to about 800 ml. After fully stirring the mixture, the black PPP/graphite powder was filtered with an acid-proof funnel. The precipitation was washed with deionized water, until no $Cu^{+2}$ was detected.

The produced PPP/graphite composite powder is then heat-treated in a furnace for approximately five hours at about 1000° C. using a heating rate of 5° C./min. This pyrolysis of PPP yields a graphitizable carbon. Following the heat-treatment, the furnace is cooled to provide PPP coke/graphite composite carbon.

X-ray diffraction of a composite particulate material made in accordance with comparative Example 4 (referred to herein as Sample D) showed that the composite contains about 82 wt. % graphite and about 18 wt. % PPP coke, respectively. The interplanar spaces of the graphite core and the PPP layer were 0.346 nm and 0.354 nm, respectively.

An electrode film and test cell were prepared in the same manner as Example 1.

COMPARATIVE EXAMPLE 5

In order to prepare another comparative sample, uncoated graphite powder was heat-treated for about five hours at approximately 1000° C. using a heating rate of 5° C./min., and then cooled to provide treated graphite powder (referred to herein as comparative Sample E). X-ray diffraction results showed that the interplanar space of the graphite is 0.346 nm.

An electrode film and test cell were prepared in the same manner as Example 1.

EXAMPLE 6

The synthesis procedure of the furfural alcohol resin/graphite composite of Example 2 (Sample B) was repeated. The produced solid composite was crushed and ground to a fine powder, and then heat-treated for about five hours at about 550° C. with a heating rate of approximately 5° C./min. The product was then cooled to provide furfural alcohol resin coke/graphite composite carbon (referred to herein as Sample F).

An X-ray diffraction analysis of Sample F indicated that the composite carbon contained 75 wt. % graphite and 25 wt. % non-graphitizable carbon. The interplanar spaces for the graphite core and the non-graphitizable coke were 0.346 nm and 0.386 nm, respectively.

COMPARATIVE EXAMPLE 7

In order to produce comparative Sample G, a furfural alcohol resin was synthesized with a procedure similar to that used to make Sample B, but without the addition of graphite powder. Thus, the resin was crushed and ground to a fine powder, and then heat-treated for about 5 hours at about 550° C. in a furnace with a heating rate of approximately 5° C./min. The product was cooled to provide an furfural alcohol resin coke referred to herein as Sample G.

Testing

The above-described button cells were used to characterize the electrochemical properties of the composite materials made by the methods described above. In the button cells, the composite carbon films were used as the working electrode, lithium films were used as the counter electrode, and 1 M $LiClO_4$ in PC—EC—DME (4:3:3) was utilized as the non-aqueous electrolyte solution. During discharging of the lithium metal, lithium ions are intercalated into carbon layers, and during charging the lithium ions are deintercalated. The charge/discharge cycle was galvanostatically performed at a voltage in a range of about 0.001V to about 2.00V.

In order to test the rechargeable life of the button cells, the deintercalation capacities of 2nd and 20th cycles for these composite carbon films were determined and listed in the table below. The capacities at each cycle are shown in FIG. 1.

| Sample | Weight % Graphite Core | Non-Graphitic Carbon (wt. %) | d(002) Non-Graphitic Carbon (nm) | Capacity 2nd Cycle (mAh/g) | Capacity 20th Cycle (mAH/g) |
|---|---|---|---|---|---|
| A | 75 | 25 | 0.378 | 320 | 322 |
| B | 78 | 22 | 0.381 | 315 | 319 |
| C | 80 | 20 | 0.365 | 356 | 245 |
| Comparative D | 82 | 18 | 0.354 | 400 | 235 |
| Comparative E | 100 | 0 | 0.3465 (graphite) | 355 | 265 |
| F | 75 | 25 | 0.386 | 310 | 308 |
| Comparative G | 0 | 100 | 0.381 | 200 | 210 |

As can be seen from the table and FIG. 1, Sample A, Sample B, and Sample F all provided excellent rechargeability, as exemplified by the lack of degradation of the capacities of their test cells. Sample C and the naked graphite film (Sample E) each produced considerable capacity decay. Comparative Sample D had the highest initial capacity of the tested samples (400 mAh/g), but the capacity decay was much larger (165 mAh/g) than for the other tested cells.

The pyrolytic product of PPP (comparative Sample D) is graphitizable carbon, while the pyrolytic products of the epoxy and furfural alcohol resins (Samples A, B, F) are non-graphitizable (hard) carbons. Thus, these results indicate that a composite comprising a graphite core embedded into a non-graphitizable carbon is the optimum structure for good cycle life. These data also show that the interplanar spaces (d(002)) of the non-graphitizable carbon are about 0.37 nm or greater.

Figure 2:
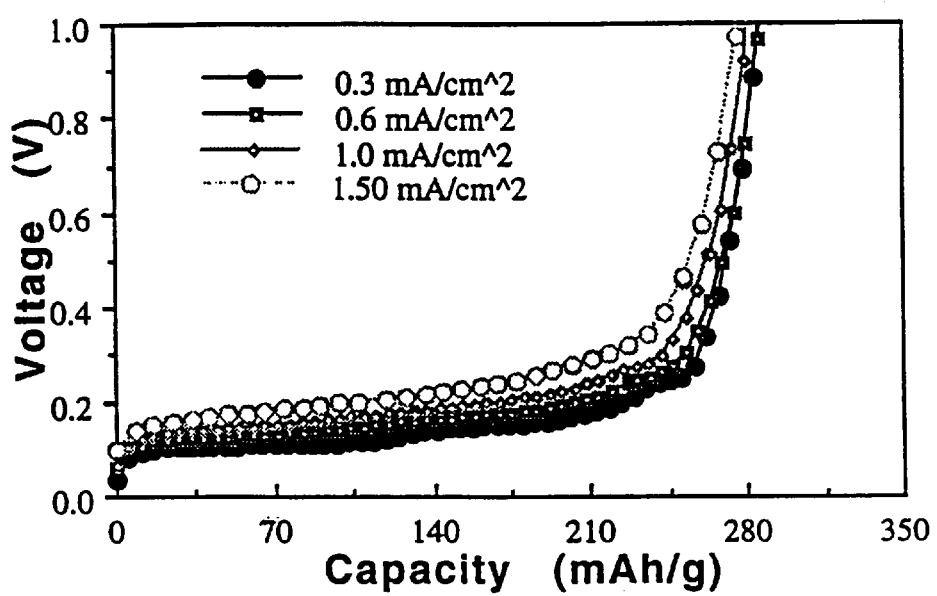
FIG. 2 is a graph showing the deintercalation curves of Sample A of the invention at various current densities.

FIG. 2 shows the deintercalation curves at various current densities of button cells assembled with an anode including Sample A. (The counter electrode is a lithium film and the electrolyte is 1 M $LiClO_4$ in PC—EC—DME (4:3:3).) As seen in FIG. 2, the capacity of Sample A appears to be constant, even when the cell is charged at high current density. The high current density and high diffusion rate of Sample A are therefore believed to be related to the structure of the inventive particulate material.

Figure 3:
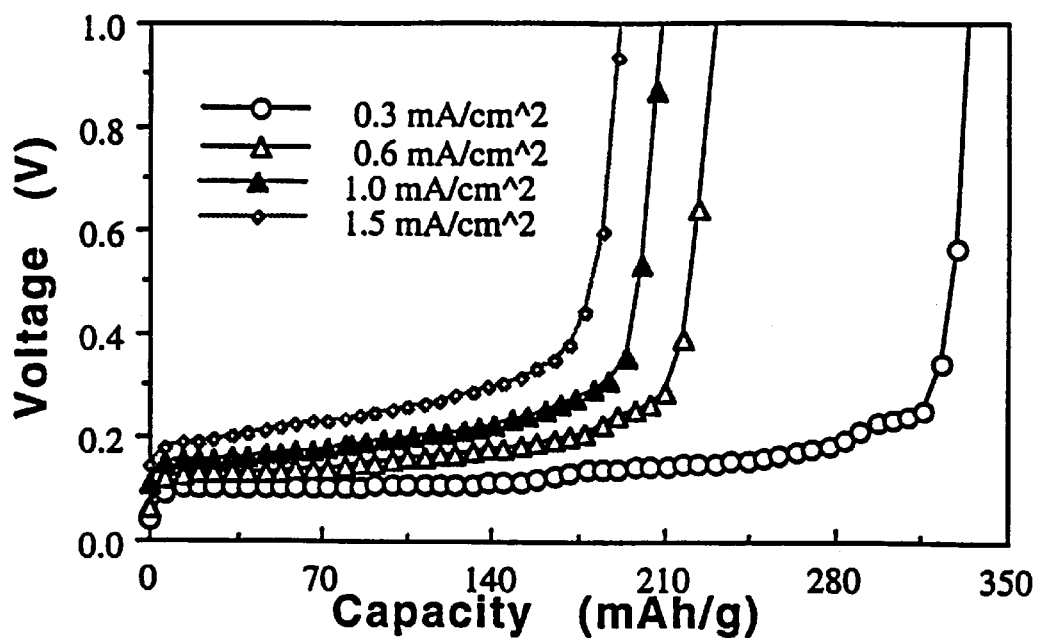
FIG. 3 is a graph showing the deintercalation curves of comparative Sample E at various current densities.

FIG. 3 shows deintercalation curves at various current densities of button cells assembled with a working electrode comprising comparative Sample E (naked graphite). (The counter electrode was a lithium film, and the electrolyte was 1 M $LiClO_4$ in PC—EC—DME (4:3:3).) In contrast to Sample A, recharging at a high current density of 1.50 $mA/cm^2$ resulted in severe capacity deterioration, from 330 mAh/g to 190 mAh/g. Although the invention is not limited to any particular mechanism, the plate-like shape of graphite powder and the preferred orientation formed during film formation by rolling or press is believed to increase the path length for the lithium diffusion (intercalation) to the edges of graphite crystallite plates, thereby undesirably decreasing the lithium intercalation rate for Sample E. Problems associated with negative kinetics reduce the relative capacity of graphite when charged at high current density. Furthermore, if the graphite anode is charged using a high current density, it is believed that polarization of the anode of Sample E may give rise to the precipitation of lithium metal on the carbon particle surface, which would cause a severe deterioration in cycling performance.

Figure 4:
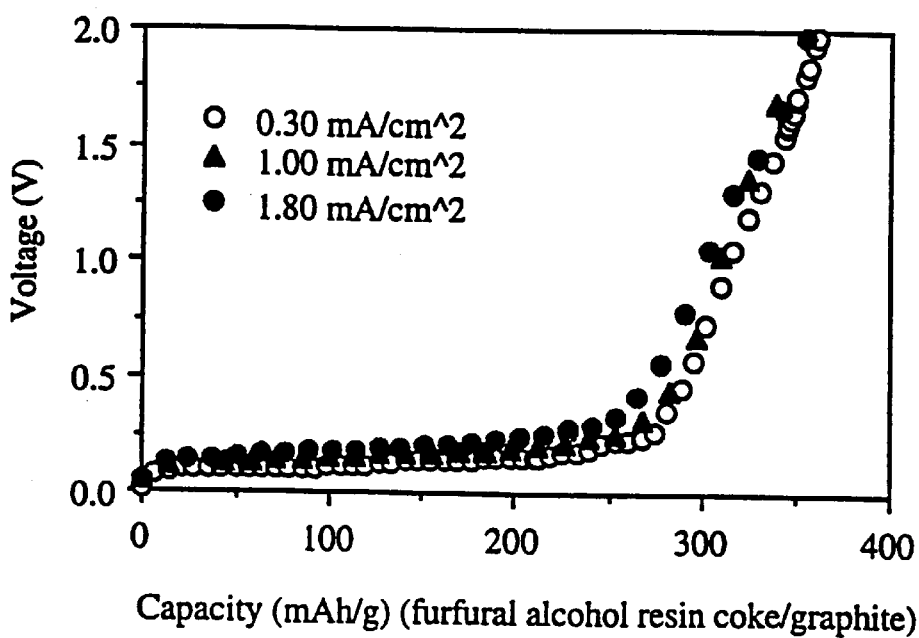
FIG. 4 is a graph showing the deintercalation curves of Sample F of the invention at various current densities; and, FIG. 5 is a graph showing the deintercalation curves of comparative Sample G at various current densities.

FIG. 4 shows the deintercalation curves at various current densities of button cells assembled with a working electrode comprising Sample F. (The counter electrode was a lithium film, and the electrolyte was 1 M $LiClO_4$ in PC—EC—DME (4:3:3).) The capacity of the cell utilizing a material comprising Sample F of the invention is almost constant, even when the cell is charged with high current density, as seen in FIG. 4. The excellent performance exhibited by Sample F at high current density suggests a high diffusion rate provided by the inventive composite carbon material comprising a graphite core embedded into a non-graphitizable carbon pyrolysized from furfural alcohol resin.

Figure 5:
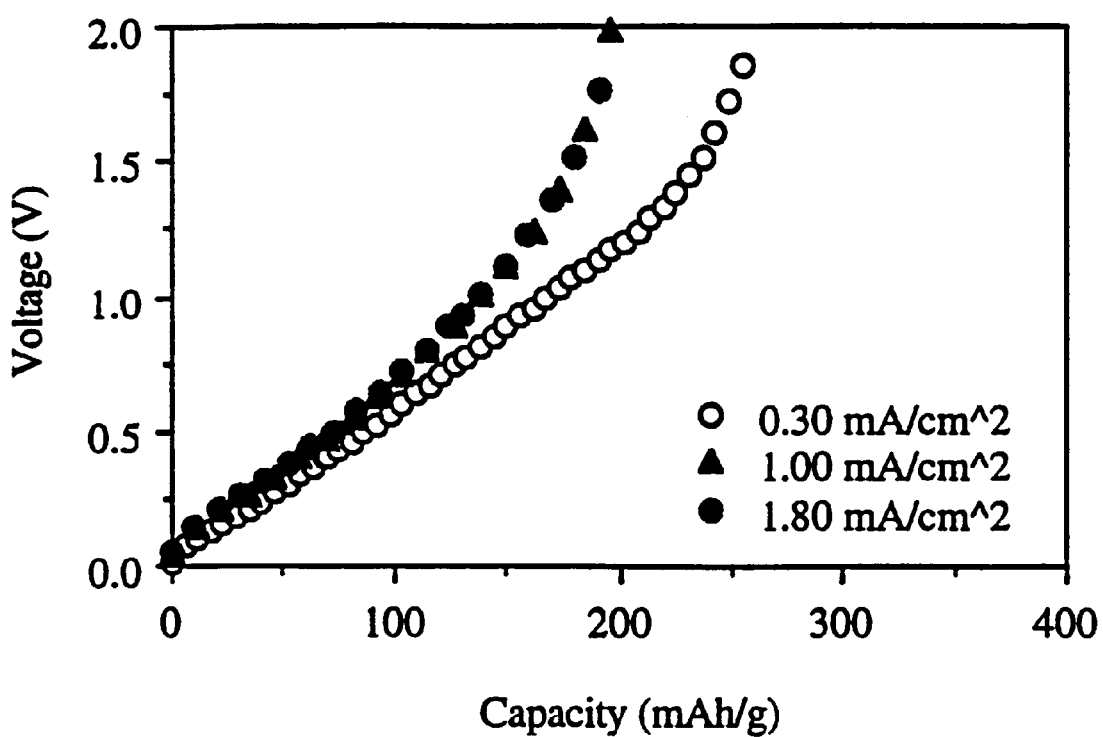

By contrast, FIG. 5 shows the deintercalation curves at various current densities of a button cell assembled with comparative Sample G (100% furfural alcohol resin coke). (The counter electrode was a Li film, and the electrolyte was 1 M $LiClO_4$ in PC—EC—DME (4:3:3).) As seen in FIG. 5, the cells utilizing the furfural alcohol resin coke (treated at about 550° C.) showed much lower capacity than the cells of the invention. However, when the current density increases from 1.0 to 1.8 $mA/cm^2$, the capacity is relatively constant. This suggests that the furfural alcohol resin coke provides better kinetics than those of comparative Sample D, for example.

The foregoing data show that a composite carbon particles comprising, and preferably consisting essentially of, a graphite core embedded into non-graphitizable carbon shows high current output, flat voltage output, excellent reversibility or chargeability, and long cycle life. This structure allows the carbon anode material to have properties that combine both the advantages of graphite and disordered carbon coke material in one composite material structure.

A range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A composite particle suitable for use in a battery anode, comprising:
    a graphite core having an outer surface and a non-graphitizable carbon material substantially disposed on at least a portion of said outer surface, said graphite core being characterized by interplanar spacings of at least about 0.346 nm.

2. The composite particle of claim 1, wherein said graphite core comprises natural graphite.

3. The composite particle of claim 1, wherein said graphite core comprises artificial graphite.

4. The composite particle of claim 1, wherein said graphite core comprises pseudo-graphite.

5. The composite particle of claim 1, wherein the non-graphitizable carbon material has interplanar spacing of about 0.37 nm or greater.

6. The composite particle of claim 1, wherein the weight percentage of graphite is in a range of about 50% to about 85% based upon the total weight of the particle.

7. A method of producing a composite carbon particle, comprising the steps of:
    (a) providing a graphite core;
    (b) providing a carbon precursor resin substantially on an outer surface of said core; and
    (c) subjecting said carbon precursor resin to an elevated temperature in a range of about 800° C. to about 1600° C. to form a non-graphitizable carbon shell around at least a portion of said outer surface of said core,
    whereby said graphite core is characterized by interplanar spacings of at least about 0.346 nm.

8. The method of claim 7, wherein said carbon precursor resin comprises a cross-linked polymer.

9. The method of claim 8, wherein the cross-linked polymer is chemically synthesized in situ on a surface of the core.

10. The method of claim 7, wherein said resin is selected from the group consisting of epoxy resins, furfural alcohol resins, and polyaniline resins.

11. The method of claim 10, wherein said core comprises a material selected from the group consisting of natural graphite, artificial graphite, and pseudo-graphite.

12. The method of claim 7, wherein the non-graphitizable carbon shell comprises layers having interplanar spacing of about 0.37 nm or greater.

13. The composite particle of claim 1, further comprising a binder on said graphite core and non-graphitizable carbon material.

14. An anode electrode material, comprising:
    a plurality of composite particles in the form of a powder, with substantially each of said particles comprising a graphite core having an outer surface and a non-graphitizable carbon material substantially disposed on at least a portion of said outer surface, said graphite core being characterized by interplanar spacings of at least about 0.346 nm.

15. The material of claim 14, wherein said substantially each of said particles have an average particle diameter in a range of about 5 microns to about 15 microns.

16. A composite particle suitable for use in a battery anode, comprising:
    a graphite core having an outer surface and a non-graphitizable carbon material substantially disposed on at least a portion of said outer surface, said graphite core being present by at least about 75 wt. % and characterized by interplanar spacings of at least about 0.346 nm and said non-graphitizable carbon material being characterized by interplanar spacings of at least about 0.37 nm.

17. A method of producing a composite carbon particle suitable for use in a battery anode, comprising the steps of:
    (a) providing a graphite core of at least about 75 wt. %;
    (b) providing a carbon precursor resin substantially on an outer surface of said core; and
    (c) subjecting said carbon precursor resin to an elevated temperature in a range of about 800° C. to about 1600° C. to form a non-graphitizable carbon shell around at least a portion of said outer surface of said core,
    whereby said graphite core is characterized by interplanar spacings of at least about 0.346 nm and said non-graphitizable carbon shell is characterized by interplanar spacings of at least about 0.37 nm.

* * * * *